US012357909B2

(12) United States Patent
Cary (10) Patent No.: US 12,357,909 B2
(45) Date of Patent: Jul. 15, 2025

(54) LATENCY-AWARE PLAYER INPUT FILTERING FOR PLAYER INTERACTIVE WINDOWS IN CLOUD GAMING

(71) Applicant: GOOGLE LLC, Mountain View, CA (US)

(72) Inventor: Daniel Cary, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 502 days.

(21) Appl. No.: 17/786,942

(22) PCT Filed: Apr. 28, 2020

(86) PCT No.: PCT/US2020/030218
§ 371 (c)(1),
(2) Date: Jun. 17, 2022

(87) PCT Pub. No.: WO2021/183158
PCT Pub. Date: Sep. 16, 2021

(65) Prior Publication Data
US 2023/0033340 A1     Feb. 2, 2023

Related U.S. Application Data

(60) Provisional application No. 62/988,475, filed on Mar. 12, 2020.

(51) Int. Cl.
*A63F 13/355*     (2014.01)
*A63F 13/358*     (2014.01)
(Continued)

(52) U.S. Cl.
CPC .......... *A63F 13/355* (2014.09); *A63F 13/358* (2014.09); *A63F 13/44* (2014.09);
(Continued)

(58) Field of Classification Search
CPC .... G06F 3/048; G06F 3/04481; A63F 13/355; A63F 13/358; A63F 13/44
See application file for complete search history.

(56) References Cited

U.S. PATENT DOCUMENTS 7,515,136 B1 *  4/2009  Kanevsky .......... G06Q 30/0267
                                                        40/624
8,806,054 B1 *  8/2014  Overton ................. A63F 13/31
                                                        715/720
(Continued)

FOREIGN PATENT DOCUMENTS

JP     2007079929 A        3/2007
JP     2008310777 A    *  12/2008
(Continued)

OTHER PUBLICATIONS

International Search Report and Written Opinion mailed Sep. 21, 2020 for corresponding International Application No. PCT/US2020/030218, 16 pages.
(Continued)

*Primary Examiner* — Steven J Hylinski (57) ABSTRACT

A remote, or cloud, gaming system includes a gaming server coupled to a client device and to a game controller via a network. The gaming server is configured to execute a video game application. Responsive to detecting instantiation of a player interactive window in a video stream generated in association with the video game application, the server is further configured to preventing one or more player inputs from the game controller that are received in a specified filter window following instantiation of the player interactive window from being interpreted by the video game application as player input that is reactive to the player interactive window.

20 Claims, 4 Drawing Sheets

(51) Int. Cl.
*A63F 13/44* (2014.01)
*G06F 3/048* (2013.01)
*G06F 3/0481* (2022.01)

(52) U.S. Cl.
CPC ............ *G06F 3/048* (2013.01); *G06F 3/0481* (2013.01); *A63F 2300/538* (2013.01); *A63F 2300/5593* (2013.01)

(56) References Cited

U.S. PATENT DOCUMENTS

| | | | |
|---|---|---|---|
| 2002/0094069 | A1 | 7/2002 | Takahashi |
| 2007/0016876 | A1 | 1/2007 | Schultz |
| 2007/0192734 | A1 | 8/2007 | Berstis et al. |
| 2007/0197234 | A1 | 8/2007 | Gill et al. |
| 2011/0090144 | A1 | 4/2011 | Rajamani et al. |
| 2011/0157196 | A1* | 6/2011 | Nave ............... A63F 13/358 345/522 |
| 2011/0187661 | A1 | 8/2011 | Wakizaka et al. |
| 2013/0167075 | A1* | 6/2013 | Chanda ............ G06F 3/0481 715/781 |
| 2015/0067594 | A1* | 3/2015 | Choi ............... G06F 3/0488 715/808 |
| 2016/0366228 | A1 | 12/2016 | Overton et al. |
| 2016/0381158 | A1 | 12/2016 | Curtis et al. |
| 2017/0277360 | A1* | 9/2017 | Breedvelt-Schouten ............ G06F 3/013 |
| 2018/0203674 | A1 | 7/2018 | Dayanandan |
| 2019/0321725 | A1 | 10/2019 | Zimring et al. |

FOREIGN PATENT DOCUMENTS

| | | |
|---|---|---|
| JP | 2012143500 A | 8/2012 |
| JP | 2016097132 A | 5/2016 |

OTHER PUBLICATIONS

Translation of Japanese Office Action mailed Sep. 5, 2023 for JP Application No. 2022-520309, 5 pages.
Translation of Korean Office Action mailed May 7, 2024 for KR Application No. 1020227019551, 18 pages.
International Preliminary Report on Patentability mailed Sep. 22, 2022 for corresponding International Application No. PCT/US2020/030218, 10 pages.
European Notice of Allowance mailed Feb. 24, 2023 for EP Application No. 20725390.7, 37 pages.
Translation of Korean Allowance of Patent mailed Jan. 7, 2025 for KR Application No. 10-2022-7019551, 4 pages.

* cited by examiner

LATENCY-AWARE PLAYER INPUT FILTERING FOR PLAYER INTERACTIVE WINDOWS IN CLOUD GAMING

CROSS-REFERENCE TO RELATED APPLICATIONS

The present application is a U.S. National Stage under 35 U.S.C. § 371 of International Patent Application Serial No. PCT/US2020/030218, entitled "LATENCY-AWARE PLAYER INPUT FILTERING FOR PLAYER INTERACTIVE WINDOWS IN CLOUD GAMING" and filed on 28 Apr. 2020, which claims priority to U.S. Provisional Application No. 62/988,475, entitled "LATENCY-AWARE PLAYER INPUT FILTERING FOR PLAYER INTERACTIVE WINDOWS IN CLOUD GAMING" and filed on 12 Mar. 2020, the entireties of which are incorporated by reference herein.

BACKGROUND

Interactive video game applications frequently employ player interactive windows to receive direction or other input from the player via manipulation of one or more buttons on the player's game controller. To illustrate, a player interactive window may be displayed during game play to present a player with a tutorial on how to use a recently-acquired tool in the game play, or a player interactive window may be displayed to prompt the player to select one of a plurality of options with respect to some aspect of the game play. As such player interactive windows typically seek player input via the same buttons used by the player during the course of normal game play. As such, if the player is pressing a button intending to provide input to normal game play but a player interactive window is generated and displayed concurrently with the button press, the gaming system is at risk of interpreting that button press as input intended for the player interactive window. For example, if the player presses a "Y" button during game play with the intent to cause the game character to jump, but a tutorial window that uses the selection of the "Y" button as input indicating that the tutorial window should be closed is instantiated and shown to the player, the player's press of the "Y" button concurrent with display of the tutorial window could inadvertently be interpreted by the gaming system as the player's direction to close the tutorial window, which then would deprive the player of the opportunity to read the content of the tutorial window.

In a conventional gaming system in which the processing system executing the video game application, the display device displaying the video stream rendered by the video game application, and the game controller providing player input are locally connected (e.g., via hardwiring or a personal area network or local area network), there is some risk of game controller button manipulation intended for normal game play being misinterpreted as player input in association with a player interactive window being displayed before the player has recognized its presence. However, this risk is particularly exacerbated in cloud gaming configurations in which the game controller and display are remotely connected to the processing system executing the video game application due to the latencies between rendering of the frames containing the player interactive window and the display of the frames and between player manipulation of a given button on the game controller and receipt of data at the processing system indicating the manipulation of that button. To illustrate, if it takes 20 milliseconds (ms) for the first rendered frame with a player interactive window to be displayed and it also takes 20 ms for a player's press of a particular button to reach the remote processing system, then it is possible that the player's press of a particular button during normal game play could be erroneously interpreted by the remotely-executed video game application as player input to a player interactive window 40 ms before that player interactive window first appears on the player's display.

SUMMARY

In one example, a computer-implemented method includes executing a video game application at a server that is remotely connected to a game controller and a client device used for player interaction with the video game application. The method further includes, responsive to detecting, at the server, instantiation of a player interactive window in a video stream generated in association with the video game application, preventing one or more player inputs from the game controller that are received in a specified filter window following instantiation of the player interactive window from being interpreted by the video game application as player input that is reactive to the player interactive window (i.e., occurs in response to displaying the player interactive window in the video game application). Whereas a player interactive windows may in particular related to an information to be displayed in the video game application, a filter window shall relate to a set time slot following the point of time when an instantiation of the player interactive window has occurred.

In some embodiments, preventing (or, in other words, blocking) one or more player inputs from the game controller to be interpreted by the video game application as player input that is reactive to the player interactive window includes preventing one or more player inputs from the game controller to be interpreted by the video game application as player input that is reactive to the player interactive window during a set duration of the filter window following instantiation of the player interactive window.

In some embodiments, the method further includes determining a cumulative latency representative of at least one network latency in a network connecting the server, the client device, and the game controller; setting a duration of the filter window based on the cumulative latency, and can further include determining at least one of a first network latency for transmission of data of the video stream to the client device and a second network latency for transmission of player input data from the game controller to the server, wherein the cumulative latency is representative of at least one of the first network latency and the second network latency. The method also can include determining a player reaction time, wherein the cumulative latency is further representative of the player reaction time.

In some embodiments, preventing the one or more player inputs from being interpreted by the video game application as player input that is reactive to the player interactive window includes filtering out the one or more player inputs from a player input stream provided to the video game application for a duration of the filter window. In other embodiments, preventing the one or more player inputs from being interpreted by the video game application as player input that is reactive to the player interactive window comprises temporarily setting the player interactive window as non-interactive in the video game application for a duration of the filter window. In still further embodiments, preventing one or more player inputs from being interpreted by the video game application as player input that is reactive to the player interactive window includes: determining a subset of one or more player inputs that invoke an action with respect to the player interactive window; and preventing only those player inputs of the determined subset from being interpreted by the video game application as player input that is reactive to the player interactive window. Still further, preventing one or more player inputs from being interpreted by the video game application as player input that is reactive to the player interactive window can include preventing all player inputs received at the server during the filter window from being interpreted by the video game application as player input that is reactive to the player interactive window.

In some embodiments, detecting instantiation of the player interactive window includes receiving a notification from the video game application that the player interactive window is being instantiated by the video game application. In some embodiments, detecting instantiation of the player interactive window includes detecting, at the server, an initial presence of an object indicating a player interactive window is present in a frame of the video stream using an object recognition model. In this case, the object recognition model can represent one or more characteristics indicative of a player interactive window, including at least one of: a location of the object within a certain area of the frame, a size or dimension of the object, a shape of the object, a presence of certain alphanumeric characters in the object, a color of the object, and a shading of the object.

In another example, a remote gaming system includes a server coupleable to a client device and to a game controller via a network. The server is configured to execute a video game application and, responsive to detecting instantiation of a player interactive window in a video stream generated in association with the video game application, preventing one or more player inputs from the game controller that are received in a specified filter window following instantiation of the player interactive window from being interpreted by the video game application as player input that is reactive to the player interactive window.

In some embodiments, the server is configured to prevent one or more player inputs from the game controller to be interpreted by the video game application as player input that is reactive to the player interactive window during a set duration of the filter window following instantiation of the player interactive window.

In some embodiments, the server is further configured to determine a cumulative latency representative of at least one network latency in the network connecting the server, the client device, and the game controller; and set a duration of the filter window based on the cumulative latency. In some embodiments, the server is further configured to: determine at least one of a first network latency for transmission of data of the video stream to the client device and a second network latency for transmission of player input data from the game controller to the server; wherein the cumulative latency is representative of at least one of the first network latency and the second network latency.

In some embodiments, the server is configured to prevent the one or more player inputs from being interpreted by the video game application as player input that is reactive to the player interactive window by filtering out the one or more player inputs from a player input stream provided to the video game application for a duration of the filter window. In other embodiments, the server is configured to prevent the one or more player inputs from being interpreted by the video game application as player input that is reactive to the player interactive window by temporarily setting the player interactive window as non-interactive in the video game application for a duration of the filter window.

In some embodiments, the server is configured to prevent one or more player inputs from being interpreted by the video game application as player input that is reactive to the player interactive window by: determining a subset of one or more player inputs that invoke an action with respect to the player interactive window; and preventing only those player inputs of the determined subset from being interpreted by the video game application as player input that is reactive to the player interactive window. In other embodiments, the server is configured to prevent one or more player inputs from being interpreted by the video game application as player input that is reactive to the player interactive window by preventing all player inputs received at the server during the filter window from being interpreted by the video game application as player input that is reactive to the player interactive window.

In some embodiments, the server is configured to detect instantiation of the player interactive window by receiving notification from the video game application that the player interactive window is being instantiated by the video game application. In some embodiments, the server is configured to detect instantiation of the player interactive window by detecting an initial presence of an object indicating presence of a player interactive window in a frame of the video stream using an object recognition model. In some embodiments, the object recognition model represents one or more characteristics indicative of a player interactive window, including at least one of: a location of the object within a certain area of the frame, a size or dimension of the object, a shape of the object, a presence of certain alphanumeric characters in the object, a color of the object, and a shading of the object.

In some embodiments, the server is further configured to determine a player reaction time and wherein the cumulative latency is further representative of the player reaction time. In some embodiments, the system further includes the game controller and the client device.

Generally, the present solution in particular relates to remote, or "cloud", gaming systems employ gaming servers that are connected to the display and game controller of a player via one or more wide area packet-switched networks. Being remote in this manner, there is considerable latency between when the video game application executing at the gaming server has instantiated a player interactive window in a corresponding frame of a rendered video stream and when that same frame is displayed at the distant display of the player. Likewise, a similar relatively-long latency is exhibited between when the player manipulates a button on the game controller and data or other signaling representative of that button manipulation is received by the video game application. This cumulative latency often can result in a player's button manipulation during normal game play (that is, game play when no player interactive window is present) being erroneously interpreted by the video game application as player input reactive to a player interactive window that has been instantiated but has not yet been recognized as being present by the player. This can manifest in undesirable ways. For example, the player input could be interpreted as invoking an action associated with the player interactive window and revising the game play to reflect the invoked action before the player is even aware of the player interactive window. As another example, this latency could result in player input being interpreted as a invoking the action of closing a tutorial window before the player is even aware that the tutorial window exists (and thus depriving the player of the chance to review the content of the tutorial window).

The present solution in particular relates to systems and techniques for mitigating the inadvertent interpretation of player input during normal game play (that is, gameplay when a player interactive window is not present) as player input that is in reaction to a player interactive window in a cloud gaming system through the use of latency-aware player input filtering following detection of instantiation of a player interactive window. In at least one embodiment, a gaming server detects instantiation of a player interactive window by a video game application executing at the gaming server. The player interactive window can be detected through explicit notification by the video game application that it is instantiating the player interactive window, such as through a signal submitted via an application programmer interface (API), or detected through inference, such as by a software platform facilitating execution of the video game application detecting the presence of an object in a frame that is likely a player interactive window through use of an object recognition model. In response to detecting instantiation of the player interactive window, the gaming server then implements a filter window for a specified duration following detection of instantiation of the player interactive window, during which player inputs are filtered out so as to prevent interpretation of the filtered-out player inputs as player input that is reactive to the player interactive window. In at least one embodiment, the duration of this window is based on a current cumulative latency exhibited by the cloud gaming system. This current cumulative latency can include a sum of one or more of: a detected or estimated latency in the network path between the gaming server and the display, a detected or estimated player response time, a detected or estimated data processing delay, and the like.

In some embodiments, the filtering window is employed directly by the video game application. To illustrate, the video game application itself can include program code that treats the instantiated player interactive window as non-interactive for a filtering window duration following the video game application's instantiation of a player interactive window, and thus any player input received by the video game application do not invoke an action by the video game application. In other embodiments, the platform software facilitating execution of the video game application employs this filtering window following detection of instantiation of a player interactive window, and the video game application is entirely unaware that any player input (or any relevant player input) has been received for the duration of the filtering window. In instances where the gaming system has knowledge of which buttons of the game controller are relevant to the instantiated player interactive window, the filtering window can be employed to filter out only player inputs pertaining to manipulation of those buttons. To illustrate, if the only player interactivity being monitored with respect to an instantiated tutorial window is the press of the A button on the game controller to close a tutorial window, the filtering window can be limited to only filtering out player input corresponding A button manipulations while allowing player input corresponding to manipulation of the other buttons of the game controller to pass through to the video game application without filtering. In other instances, such as when the buttons relevant to the player interactive window are unknown, all player input representing manipulation of any button of the game controller is filtered during the filtering window.

When the filtering window lapses, the gaming server ceases filtering of player input responsive to the detected instantiation of the player interactive window, and thus all player input received thereafter at the gaming server from the player's manipulation of the game controller is permitted to flow to the video game application unimpeded. Alternatively, the gaming server can instruct the video game application to perform the player input filtering. Through use of this filtering window following detection of instantiation of a player interactive window, the cloud gaming system can provide sufficient time for at least one or more of the initial rendered frames containing the instantiated player interactive window to transmit to, and be displayed at, the display of the player and to be recognized as such by the player without having any relevant player input provided by the player in the interim be interpreted as an intended interaction reactive to the player interactive window instead of with normal game play.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
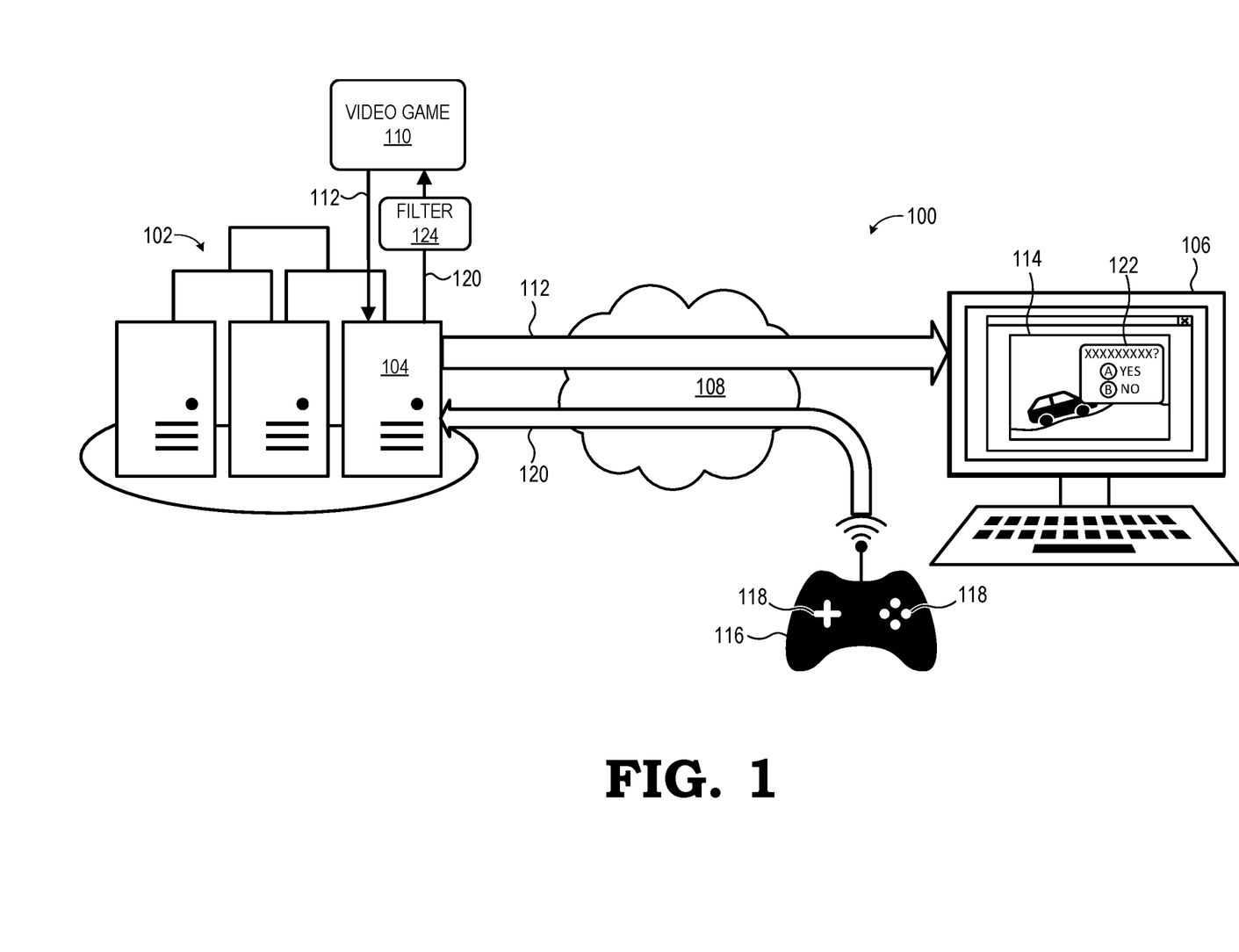
FIG. 1 is a block diagram illustrating a cloud gaming system employing latency-aware interactivity delays in accordance with some embodiments.

FIG. 1 illustrates a cloud gaming system 100 employing latency-aware interactivity delays to mitigate unintended player interaction with player interactive windows in accordance with at least one embodiment. The cloud gaming system 100 includes a data center 102 having a gaming server 104 connected to a client device 106 via one or more packet-switched networks 108. The gaming server 104 operates to execute a video game software application 110 (hereinafter, "video game 110") that results in the real-time rendering of a sequence of video frames, which the gaming server 104 encodes and otherwise formats for inclusion in a video stream 112 transmitted to the client device 106. The client device 106 operates to receive the video stream 112, decode the encoded video frames contained therein, and display the decoded video frames in sequence so as to provide a video presentation of rendered graphical content to a player. Audio content is generated by the gaming server 104 through execution of the video game 110 and provided to the client device 106 for output to the player in a similar manner.

The client device 106 includes a network interface (not shown) connected to the network 108 to receive the video data and audio data transmitted from the gaming server 104 via the network 108, and compute, storage, and display resources (not shown) for decoding and displaying the video frames of the transmitted video stream 112 and for outputting the corresponding audio content. The client device 106 can include, for example, a desktop computer, a notebook computer, a tablet computer, a compute-enabled cellular phone (that is, a "smart phone"), a compute-enabled television (that is, a "smart TV"), and the like. In some embodiments, the processing and display of video and audio content from the video game 110 executed at the gaming server 104 is facilitated by a software application executed at the client device 106 (and represented in FIG. 1 by graphical user interface (GUI) 114). This software application can include, for example, a cloud-gaming-specific software application. In other embodiments, a more general software application is utilized, and the video stream 112 and audio stream (not shown) are formatted and transmitted by the gaming server 104 to be compatible with this software application. For example, in one embodiment the client device 106 utilizes a web browser that utilizes a hypertext markup language (HTML) format for display of the video content represented by the video stream 112 and output of the audio content represented by the associated audio stream, and the gaming server 104 provides the video stream 112 in a format, such as .mp4 or .MOV, compatible with the HTML format for display via the web browser.

Being interactive, the video game 110 utilizes player input to at least partially direct the game play experience of a gaming session with the player. This player input is received at least in part through a game controller 116 having one or more user-manipulable components 118 that, in response to being manipulated by the player, result in a processing component of the game controller 116, or otherwise associated with the game controller 116, generating a corresponding player feedback data and providing that player feedback data for transmission to the gaming server 104 via the packet-switched network 108 as part of a player input stream 120. Although illustrated in FIG. 1 as having a "game pad" or "joystick" form factor, the game controller 116 can include any of a variety or combination of player input devices, such as a game pad, joystick, keyboard, mouse, touchpad, trackball, steering wheel or yoke, pedal, dance pad, simulated gun, optical motion tracker, inertial sensor, light/laser source and detector, and the like. As such, these user-manipulable components 118 can include buttons, paddles, keys, rotary detectors, motion detectors for corresponding motions, pressure sensors, touch sensors, light sensors, microphones or other audio sensors, and the like. For ease of reference and in recognition of common colloquial use, the user-manipulable components 118 are generally referred to herein as "buttons 118" or more generally "buttons" and "pressing" a button or "press" of a button will be understood to be the manipulation of a user-manipulable component 118 in a manner results in the game controller 116 generating and transmitting a corresponding player input data. That is, reference to pressing of a button should not be limited to a player literally pressing a physical button, but rather is understood to refer to a player manipulating a user-manipulable component 118 of any form in a manner that results in generation of corresponding input. For example, a player making a particular motion in view of an optical motion tracker and a player speaking a specified word into a microphone both constitute "pressing a button 118" of the game controller 116.

In some embodiments, the game controller 116 is tethered to the client device 106 such that the player input data is transmitted to the packet-switched network 108 via the client device 106. To illustrate, the game controller 116 can be wired or wirelessly connected to the client device 106 such that all data output by the game controller 116 is routed through a network interface between the client device 106 and the packet-switched network 108. In other embodiments, the game controller 116 has a separate, independent network connection with the gaming server 104 via the packet-switched network 108. For example, the cloud gaming system 100 could employ a wireless local area network (WLAN) access point (not shown) local to the client device 106 and the game controller 116 and connected to the network 108, and wherein each of the client device 106 and the game controller 116 establishes a separate wireless connection with the WLAN access point to independently communicate with the gaming server 104 via the network 108 and the WLAN access point.

As the gaming server 104 is "remote" relative to the client device 106 due to their connection via the one or more networks 108, there is a relatively large latency between when a video frame is rendered by the video game 110 and when the data representing that video frame is received at the client device 106 and made ready for display. Likewise, as the gaming server 104 is also "remote" relative to the game controller 116, there is also a relatively large latency between when the player pushes a button 118 on the game controller 116 and when the player input data representative of that button push is finally received by the video game software application 110. The combination of these two latencies, as well as various other latencies, such as the player's reaction time and processing latencies at the gaming server 104 and the client device 106 (the sum of which is referred to herein as the "cumulative latency"), in the cloud gaming system 100 can lead to the aforementioned issue in which player input provided during the course of normal game play is temporally generated at the same time or slightly after the video game 110 instantiates a player interactive window (hereinafter, "PIW" for brevity), such as the PIW 122 illustrated in FIG. 1, and by virtue of the latency in transmitting and displaying the first frame containing this instantiated PIW 122 and the latency in transmitting the player input data representing the player input from the game controller 116 to the gaming server 104, the player input could be misinterpreted as an interaction with the PIW 122.

Accordingly, in at least one embodiment, the gaming server 104 employs a latency-aware player input filter 124 that operates to filter out player input from the player input stream 120 from reaching the video game 110 or otherwise being acted upon by the video game 110 as an interaction with the PIW 122 during a filter window following detection of instantiation of the PIW 122 by the video game 110. The duration of the filter window is based on an estimation or other determination of the cumulative latency currently exhibited by the cloud gaming system 100, and in general is selected to be of sufficient duration to mitigate most or all of the cumulative latency while not being so long as to present an increased risk of inadvertently filtering out player input that is intended by the player to be an interaction with the PIW 122. This filtering process is described in greater detail below with reference to FIGS. 2-4.

Figure 2:
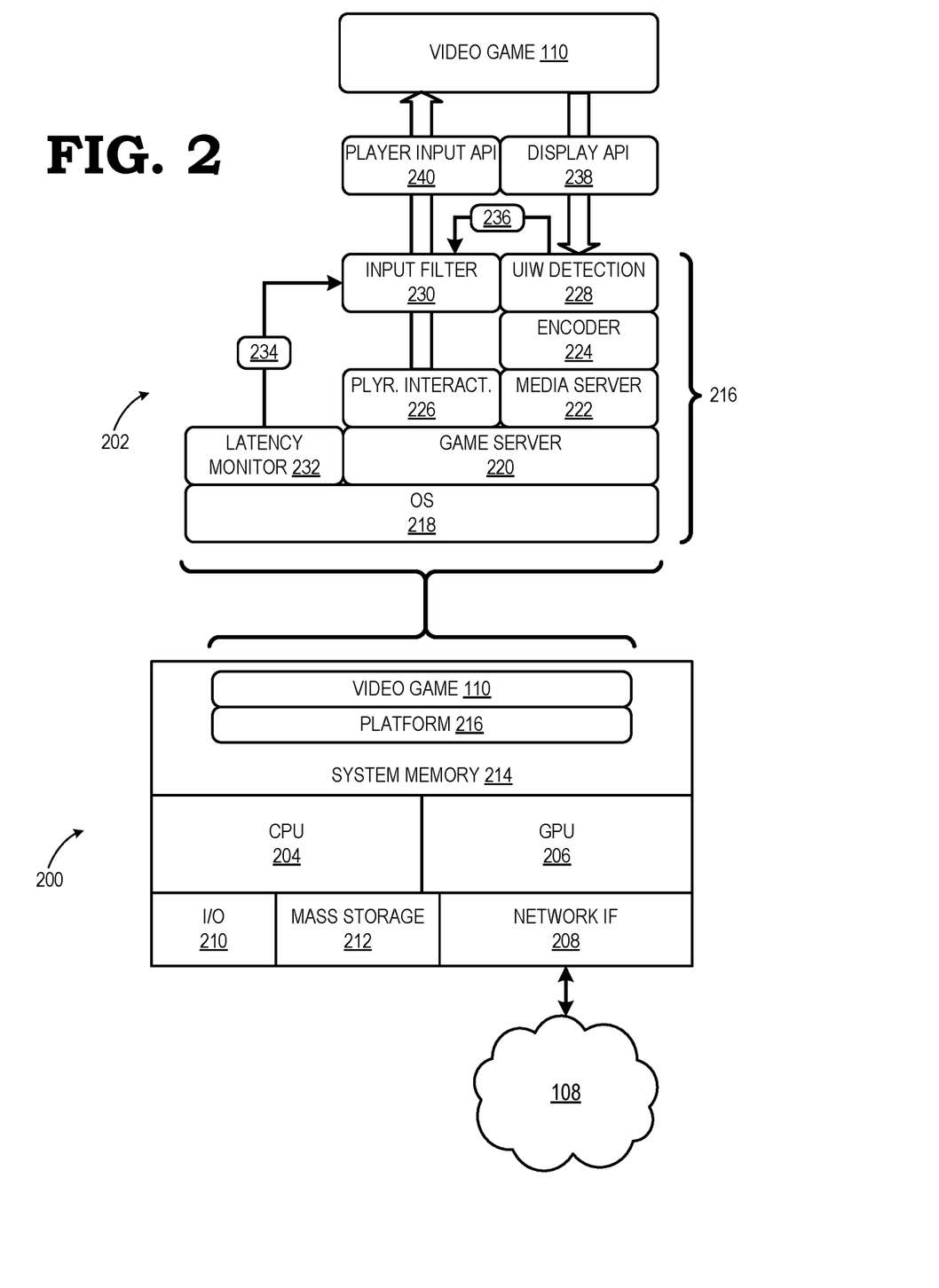
FIG. 2 is a block diagram illustrating a gaming server of the cloud gaming system of FIG. 1 in accordance with some embodiments.

FIG. 2 illustrates a general hardware configuration 200 and software configuration 202 of the gaming server 104 in accordance with some embodiments of the present disclosure. As depicted by the hardware configuration 200, the gaming server 104 includes one or more processors, such as one or more central processing units (CPUs) 204, one or more graphics processing units (GPUs 206), one or more application specific integrated circuits (ASICs)(not shown), and the like. The hardware configuration 200 further includes a network interface 208 coupled to the network 108, one or more input/output (I/O) devices 210, (such as a keyboard, mouse, or display), one or more mass storage devices 212 (such as a hard drive, optical disc drive, or network-attached storage), and the like. The hardware configuration 200 further includes at least one random access memory (RAM) or other system memory 214 accessible by the one or more processors. The system memory 214 stores one or more software applications that include program code representing executable instructions that manipulate the one or more processors to perform various operations described herein. These software applications include the aforementioned video game 110 as well as a set of one or more software applications collectively referred to as platform software 216.

As a general overview, the platform software 216 operates to facilitate execution of the video game 110 at the gaming server 104. In some implementations, the game developer of the video game 110 specifically configures the video game 110 for execution by a gaming server, in which case the platform software 216 provides application programming interfaces (APIs) and other "hooks" that provide a more transparent interaction between the hardware configuration 200 and the video game 110. In other embodiments, the video game 110 is developed for a specific local hardware platform, such as a personal computer (PC) platform or a game console platform, in which case the platform software 216 emulates the typical interfaces between the video game 110 and its expected local hardware platform, and thus renders the actual underlying hardware configuration 200 of the gaming server 104 less transparent to the video game 110. An example configuration of the platform software 216 and its interaction with the video game 110 are illustrated by the software configuration 202.

In the depicted software configuration 202, the platform software 216 includes an operating system (OS) 218, a gaming server module 220, a media server module 222, an encoder module 224, a player interactivity module 226, a PIW detection module 228, an input filter module 230, and a latency monitor module 232, as well as other various modules for supporting cloud gaming executing as known in the art. The OS 218 operates to manage the overall operation of the gaming server 104 and to act as an interface between the hardware components and the higher-level software layers. The gaming server module 220 operates to provide server-side functionalities associated with the video game 110, such as setting up game sessions, storing session state data and other game-related data, processing gameplay inputs, and rendering gameplay outputs in response to the gameplay inputs. The media server module 222 operates to host a media streaming site, receive concurrent ancillary or supplemental media streams associated with an online gaming session, and provide the concurrent media streams (e.g., video stream 112, FIG. 1) to the client device 106 for concurrent display with a gaming session that is being supported during execution of the video game 110. The encoder module 224 operates to encode the media streams for transmission to the client device 106. Although illustrated as a software module executed by the processor resources of the gaming server 104, in other embodiments the encoder module 224 can be implemented in whole or in part as a hardcoded or programmable logic integrated circuit, such as an ASIC. The player interactivity module 226 operates to extract player input data in the player input stream 120 and present the player input data as player inputs to the video game 110 in an appropriate format. To illustrate, in implementations in which the platform software 216 emulates a PC, game console or other local gaming environment, the player interactivity module 226 can operate to emulate inputs to one or more instances of the video game 110 as though the inputs were player inputs coming from a local game controller for each instance, rather than the game controller 116 remote to the gaming server 104 and connected via the network 108.

The PIW detection module 228, the latency monitor module 232, and the input filter module 230 together operate to implement the latency-aware player input filter 124 (FIG. 1). The latency monitor module 232 operates to monitor one or more of: current network conditions, processor loading conditions, and player interactions to determine the various latencies that contribute to the delay between instantiation of a PIW in a rendered frame and display of that frame at a display of the client device 106 and the delay between player manipulation of the game controller 116 and receipt of the corresponding player input data at the gaming server 104 (or, more specifically, the player interactivity module 226), and from these latencies determine a current cumulative latency value 234 representative of a summation of some or all of these individual latencies. The PIW detection module 228 operates to monitor the execution of the video game 110 to detect instantiation of a PIW in the video stream being rendered by the PIW detection module 228, and in response to such a detection, issue a PIW instantiation signal 236 to the input filter module 230 in the form of a value written to a register or other storage location, triggering of an interrupt or exception, and the like. The input filter module 230 in turn operates to implement an input filtering window in response to the PIW instantiation signal 23 indicating that a PIW has been instantiated, and for a duration that is based on the current cumulative latency value 234 provided by the latency monitor module 232. While in the input filtering window, the input filter module 230 operates to filter out some or all of the player inputs being provided by the player interactivity module 226 so as to prevent these player inputs from being acted upon by the video game 110 and thus mitigating the risk that a player input provided in a period between instantiation of a PIW in a frame and display of that frame at the client device 106, and thus presumably intended as input for normal game play, is not interpreted by the video game 110 as player input associated with the PIW.

In the illustrated embodiment, both the PIW detection module 228 and the input filter module 230 are implemented in the platform software 216; that is, "external" to the video game 110. In such embodiments, the PIW detection module 228 and the input filter module 230 can be implemented as part of, or in association with, one or more APIs provided as interfaces between the video game 110 and the platform software 216. To illustrate, software configuration 202 can employ a display API 238 used by the video game 110 to provide frame rendering calls and other instructions for execution by the GPU 206, as well as metadata associated with such frame rendering instructions, and the PIW detection module 228 can monitor the data and control flows through the display API 238 to detect instantiation of a PIW. As another example, the software configuration 202 can utilize a player input API 240 to facilitate the provision of player inputs received in the player input stream 120 to the video game 110, and the input filter module 230 can be implemented as part of, or otherwise connected to, this player input API 240. In other embodiments, one or both of the PIW detection module 228 and the input filter module 230 are implemented as part of the video game 110 itself. For example, the current cumulative latency value 234 can be provided to the video game 110, and the video game 110 itself detects that it is instantiating a PIW and in response renders the PIW non-interactive for a corresponding input filtering window or otherwise disregards some or all player inputs received from the platform software 216 via the player input API 240 for a specified duration following instantiation of the PIW and which is based on the current cumulative latency value 234.

Figure 3:
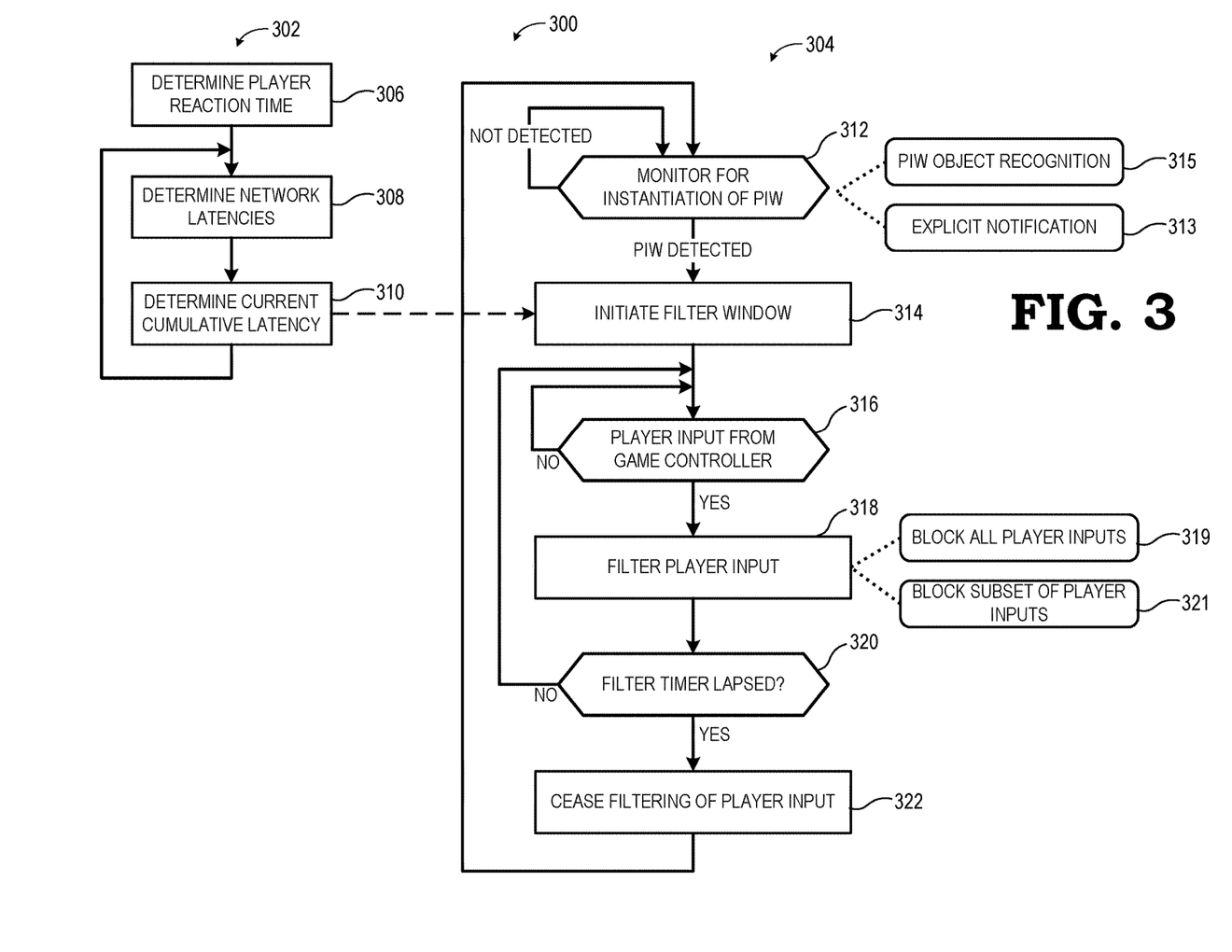
FIG. 3 is a flow diagram illustrating a method for latency-aware player input filtering in the cloud gaming system of FIGS. 1 and 2 in accordance with some embodiments.

FIG. 3 illustrates a method 300 describing the operations of the platform software 216 and video game 110, and more particularly, the latency monitor module 232, PIW detection module 228, and input filter module 230, in greater detail in accordance with some embodiments. The method 300 implements two separate subprocesses that operate concurrently at the gaming server 104: a cumulative latency monitoring subprocess 302; and a latency-aware selective player input filtering subprocess 304. Turning first to the cumulative latency monitoring subprocess 302, this subprocess serves to determine an initial value for the current cumulative latency value 234 and periodically update the current cumulative latency value 234 over time as conditions change. As previously noted, the cumulative latency value 234 is representative of a sum of various latencies in the cloud gaming system which reflect the net or sum duration between when a PIW is first instantiated in a frame rendered by the video game 110 and when the gaming server 104 can first expect to receive a player input that was intended by the player to be associated with the PIW. The latencies contributing to this duration include the encoding and other processing of the first frame within the gaming server 104, the latency involved in transmitting the first frame having the PIW from the gaming server 104 to the client device 106 via the network 108, the decoding and other processing of the first frame at the client device 106, the scan out and display of the first frame at a display of the client device 106, the player's reaction time in detecting the display of the PIW and the earliest opportunity to press a button of the game controller 116 in response, the latency in transmitting player input data representative of the press of the button from the game controller 116 to the gaming server 104 via the network 108, and the processing and provision of the player input data to the video game 110. For the following, it is assumed that the processing latencies are either minimal compared to the transmission latencies and the player reaction time, or can be incorporated using a fixed or proportional margin to represent the sum of these particular delays. However, in other embodiments, the latency monitor module 232 can estimate or otherwise detect these latencies in real time along with the other latency monitoring operations described below.

At block 306, the latency monitor module 232 determines a player reaction time value representing the player's reaction time in interacting with the video game 110. This can be an estimated value based on observed characteristics of the player in particular. To illustrate, the latency monitor module 232 can monitor the video stream 112 for particular events represented in the video content and measure how long it takes for the player to react based on received player input (and accounting for network latencies, as described below). Alternatively, the latency monitor module 232 may assume a fixed or standard player reaction time that is either general to all game play, particular to the type of game play provided by the video game 110 (e.g., a standard player reaction time for all first person shooter-type games), or particular to the specific title of the video game 110 being executed. This player reaction time value thus may be stored in configuration information for the platform software 216, or if specific to the video game title, may be provided as configuration data or metadata by the video game 110 during its initialization.

At block 308, the latency monitor module 232 determines the applicable network latencies that contribute to the instantiation/interaction delay. As noted above, these include the downstream latency in transmitting a rendered frame from the gaming server to the client device 106 via the packet-switched network and an upstream latency in transmitting a player input data from the game controller 116 to the gaming server 104 via the network 108. These latencies can be determined using any of a variety of well-known or proprietary network latency measurement techniques, such as measuring path latency using a "tracert" function, measuring the joint upstream and downstream latency using a Round Trip Time (RTT) measurement technique, measuring the upstream latency and the downstream latency separately using a Time to First Byte (TTFB) latency measurement technique, and the like.

At block 310, the latency monitor module 232 determines the current cumulative latency value 234 based on a sum of the player reaction time value and the upstream and downstream network latencies. To illustrate, for a fixed player reaction time of 300 ms, a measured upstream network latency of 60 ms, and a measured downstream network latency of 40 ms, the current cumulative latency value 234 could be determined as a straight sum of these three values, or 400 ms. In other embodiments, this sum could be increased by a fixed value (e.g., 20 ms) or a proportional value (e.g., 10%) to provide a margin of safety to account for additional latencies, such as processing latencies at the client device 106 and the gaming server 104, to arrive at the current cumulative latency value 234. In the illustrated embodiment, it is assumed that the player reaction time is relatively fixed, and thus the player reaction time value is determined at initialization and does not need to be updated or refreshed. However, in many networks, changes in congestion, utilization, and available routing paths can result in changes in network latencies, and thus the process of blocks 308 and 310 is iterated periodically to update the current cumulative latency value 234 so as to reflect current network conditions.

In parallel with the cumulative latency monitoring subprocess 302, the latency-aware selective player input filtering subprocess 304 operates to mitigate the risk of player input being inadvertently interpreted as an interaction with a PIW due to the latencies introduced by the remote relationship between the gaming server 104, the client device 106, and the game controller 116 in the cloud game system 100. Accordingly, during an iteration of the subprocess 304, at block 312 the PIW detection module 228 monitors the frame rendering process dictated by the video game 110 to detect initial instantiation of a PIW. In some embodiments, the PIW detection module 228 detects instantiation of a PIW through an explicit notification process 313 by video game 110. In this approach, the video game 110 is configured to identify when a PIW is going to be utilized and then send a notification of instantiation of the PIW to the PIW detection module 228 via an API or other interface, such as the display API 238 when the PIW detection module 228 is implemented as part of the platform software 216 or via internal signaling when the PIW detection module 228 is implemented in the video game 110 itself. It will be appreciated that this approach necessitates that the game developer develop or modify the video game title to expressly cooperate with the platform software 216 in this manner.

However, as noted above, in some implementations the platform software 216 emulates being a local gaming platform so that the video game 110 operates as though it is executing on a PC, game console, or other local platform, rather than on a cloud gaming server. In such situations, the PIW detection module 228 operates to detect instantiation of a PIW through an implicit detection using an PIW object recognition process 315 in which an object recognition model is used to detect the likely first instance of a suspected PIW in a frame being rendered for the video stream 112. To illustrate, if in frame N−1 no object indicative of a PIW is found but in the next frame N an object indicative of a PIW is detected, the PIW detection module 228 can assert the PIW instantiation signal 236 in association with frame N. The detection of an object representative of a PIW can rely on any of a variety of parameters and aspects. To illustrate, it may be understood that for a given video game title, or for a class of video games in general, that generated PIWs typically have specific sets or ranges of sizes or dimensions, particular shapes (elongated rectangles, for example), particular visual characteristics, such as color, shading, presence of rounded corners, presence of alphanumeric characters or other text, presence of specific text or other alphanumeric characters ("YES", "NO", "OK", for example), presence of button objects, presence in a particular location or area of the frame, and the like. The object detection model employed by the PIW detection module 228 thus can be used to search for the presence of such parameters and aspects, determine a confidence value based on the number and strength of the match of such parameters and aspects to components of the frame, and then identify the frame as containing an instantiated PIW via thresholding of the confidence value.

When a likely instantiation of a PIW in the video stream 112 is detected, the PIW detection module 228 provides the PIW instantiation signal 236. In response, at block 314 the input filtering module 230 triggers a filter window for filtering out player input at the gaming server 104. As explained above, the duration of the filter window typically is set based on various latencies in the cloud gaming system 100 so as to prevent most, if not all, possible player inputs that were triggered before the player is likely aware of an instantiated PIW via display of the initial frame or frames containing the PIW at the client device 106. As this duration is represented by the current cumulative latency value 234 determined by the latency monitor module 232 from the most recent iteration of the cumulative latency monitoring subprocess 302, triggering the filter window can, include for example, setting and starting a filter timer (e.g., a countdown timer) based on the cumulative latency value 234. Thereafter, while the filter window is active, at block 316 the input filter module 230 monitors the player input stream 120 received at the gaming server 104 from the game controller 116 for the presence of player input data representing a player input. When a player input is detected, at block 318 the input filter module 230 applies a filter to the player input. As represented by block 319, in some embodiments this filter is a total or complete filter in which all player inputs from game controller 116 are blocked from being provided to the video game 110 or otherwise being interpreted by the video game 110 as player interaction with the instantiated PIW. For example, explicit notification from the video game 110 of an upcoming instantiation of the PIW, or PIW instantiation detection via object recognition, may not indicate with sufficient certainty the buttons 118 that are relevant to the PIW (that is, the buttons that would provide player input that would initiate some action with respect to the PIW). In such cases, the total filtering often would be appropriate.

However, in other instances, the explicit notification process 313 involves explicit notification by the video game 110 of the player inputs that are considered to be interactive with the PIW, or the implicit detection of instantiation of a PIW may involve detecting a particular set of options associated with a particular subset of buttons of the game controller 116, in which case the input filter module 230 can instead implement targeted filtering (represented by block 321) in which only the subset of player inputs identified as pertinent to the interactivity of the PIW are filtered out, while other player inputs are permitted to be provided to the video game 110 or otherwise allowed to be acted upon by the video game 110 during the filtering window.

At block 320, the input filter module 230 monitors for the end of the filter window set at block 314, such as through observation of the lapse of a countdown timer initiated at the start of the filter window. In response, the input filter module 230 terminates or otherwise deactivates the filter window and ceases filtering of player input at block 322, such that all player input received thereafter in the player input stream 120 is permitted to be provided to, or otherwise acted upon by, the video game 110, subject to the player input being filtered by another process in the platform software 216 or in the video game 110 itself.

Figure 4:
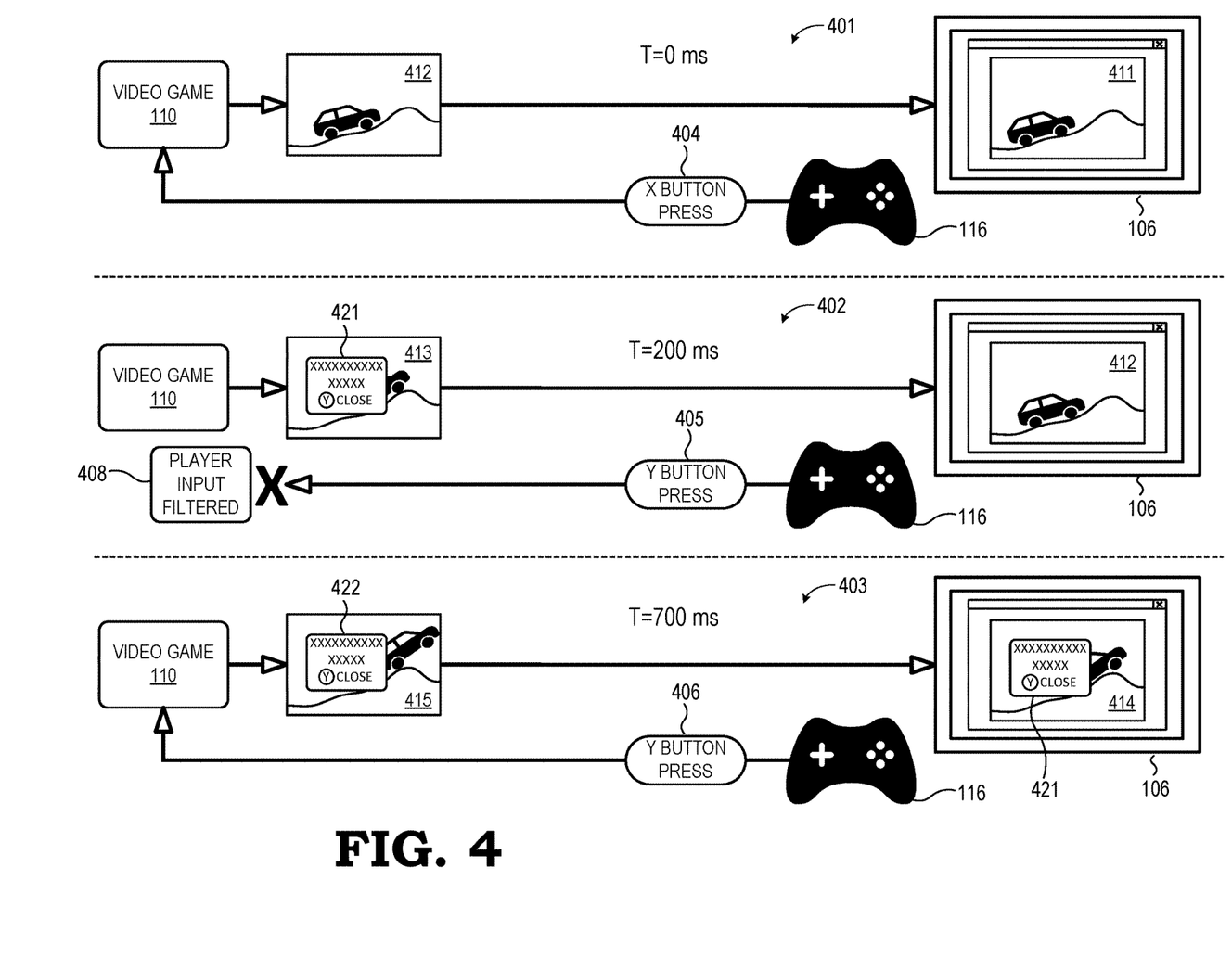
FIG. 4 is a diagram illustrating an example operation of the method of FIG. 3 in accordance with some embodiments.

FIG. 4 illustrates a simple example of the operation of method 300 of FIG. 3 in the cloud gaming system 100 of FIGS. 1 and 2 in accordance with some embodiments. In the illustrated diagram, a simplified state representation of the cloud gaming system 100 at three different points in time, time T=0 ms (view 401), T=200 ms (view 402), T=700 ms (view 403). Further, assume for this example that the player reaction time is determined to be 300 ms, the upstream and downstream latencies each currently are measured at 50 ms apiece, and an error margin of 10% is applied, resulting in a current cumulative latency of 440 ms (=(300+50+50) *1.10), represented in the current cumulative latency value 234.

As represented in view 401, at time T=0 ms a frame 411 of the video stream 112 is currently displayed at the client device 106, with frame N already having been rendered by the video game 110, transmitted to the client device 106 via the network 108, and processed for display by the client device 106. Also at this time, the video game 110 is rendering a subsequent frame 412, for which transmission has not yet initiated. Further, at time T=0 ms, the player has interacted with the game controller 116 to press an "X" button, in response to which the game controller 116 has generated a player input data 404 that is in flight to the gaming server 104.

As represented in view 402, at time T=200 ms the frame 412 is currently on display at the client device 106 and the X button press represented by the player input data 405 has already been received and implemented by the video game 110 so as to impart some effect on the gameplay. Moreover, at this time the video game 110 has rendered a frame 413 that contains the first instance of a PIW 421, which in this example is a dialog or tutorial window that prompts the player to press the "Y" button on the game controller 116 to close the window. Concurrently, the player, reacting to the game play represented by previously-displayed frames (e.g., which may include frame 411 displayed at time T=0 ms), has pressed button Y of the game controller 116, which results in player input data 405 representing the Y button press being in flight at time T=200 ms.

As view 402 illustrates, the frame 413 containing the first instance of the PIW 421 has not yet been displayed to the player, much less even reached the client device 106, and thus the player is unaware that the PIW 421 exits at time T=200 ms. As such, the player has pressed the Y button of the game controller 116 in response to normal game play as represented by frame 412, frame 411 and preceding frames displayed at the client device 106. However, from the perspective of the video game 110, the PIW 421 has been instantiated and, without a mechanism to transparently or opaquely render the PIW 421 briefly non-interactive, the gaming server 104 and the video game 110 could incorrectly interpret the Y button press represented by player input data 405 as a player interaction indicating that the PIW 421 should be closed (that is, removed from any further frames the video stream 112).

Accordingly, to mitigate the inadvertent interpretation of normal gameplay input as PIW interaction input, a filter window is implemented for a 440 ms duration (e.g., from T=200 ms to 640 ms, assuming the filter window is in place at T=200 ms) in response to instantiation of the PIW 421, such as through detecting the visual objects representative of the PIW 421 in the frame 413 or through explicit notification from the video game 110 that the PIW 421 has been instantiation. In this example, the input filter module 230 filters out all player inputs in the filter window. Accordingly, as represented by filter exclusion block 408, the Y button press represented by the player input data 405 is filtered out of the player input stream 120 when it is received and processed by the gaming server 104. This filtering out of the Y button press can include, for example, preventing the input representing the Y button press from reaching the video game 110 (e.g., by filtering it out at the platform software 216) or by external or internal direction at the video game 110 itself that instructs the video game 110 to refrain from interpreting the Y button press as an interaction with the PIW 421.

As represented in view 403, at time T=700 ms the frame 413 has already been displayed at the client device 106, a frame 414 is currently on display at the client device 106 (with frame 414 being rendered at some point after frame 413 and containing the PIW 421) and the video game 110 has rendered a subsequent frame 415 that contains another instance of the PIW 421. Concurrently, the player, reacting to the PIW 421 displayed in frame 414 and previous frames (including frame 413) has pressed button Y of the game controller 116 to close the dialog/tutorial box represented by PIW 421, which results in player input data 406 representing the Y button press being in flight at time T=700 ms.

Further, at this point in time, the filter window has terminated. Accordingly, when the player input data 406 reaches the gaming server 104 at a subsequent time, the player input data 406 is permitted to be provided to, or otherwise acted upon, by the video game 110, which in this case the represented Y button press is correctly interpreted as an interaction with the PIW 421, and more specifically, the indicated player interaction that causes the video game 110 to close the PIW 421 so that it does not appear in frames rendered subsequent to frame 415.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
executing a video game application at a server that is remotely connected to a game controller and a client device used for player interaction with the video game application; and
responsive to detecting, at the server, instantiation of a player interactive window in a video stream generated in association with the video game application, preventing one or more player inputs from the game controller that are received in a specified filter window following instantiation of the player interactive window from being interpreted by the video game application as player input that is reactive to the player interactive window,
wherein detecting instantiation of the player interactive window includes detecting, at the server, an initial presence of an object indicating a player interactive window is present in a frame of the video stream using an object recognition model.

2. The method of claim 1, wherein one or more player inputs from the game controller are prevented to be interpreted by the video game application as player input that is reactive to the player interactive window during a set duration of the filter window following instantiation of the player interactive window.

3. The method of claim 2, further comprising:
determining a cumulative latency representative of at least one network latency in a network connecting the server, a latency at the client device, and a latency at the game controller; and
setting the duration of the filter window based on the cumulative latency.

4. The method of claim 3, further comprising:
determining at least one of a first network latency for transmission of data of the video stream to the client device and a second network latency for transmission of player input data from the game controller to the server; and
wherein the cumulative latency is further representative of at least one of the first network latency and the second network latency.

5. The method of claim 4, further comprising:
determining a player reaction time; and
wherein the cumulative latency is further representative of the player reaction time.

6. The method of claim 1, wherein:
preventing the one or more player inputs from being interpreted by the video game application as player input that is reactive to the player interactive window comprises filtering out the one or more player inputs from a player input stream provided to the video game application for a duration of the filter window.

7. The method of claim 1, wherein:
preventing the one or more player inputs from being interpreted by the video game application as player input that is reactive to the player interactive window comprises temporarily setting the player interactive window as non-interactive in the video game application for a duration of the filter window.

8. The method of claim 1, wherein:
preventing one or more player inputs from being interpreted by the video game application as player input that is reactive to the player interactive window comprises:
determining a subset of one or more player inputs that invoke an action with respect to the player interactive window; and
preventing only those player inputs of the determined subset from being interpreted by the video game application as player input that is reactive to the player interactive window.

9. The method of claim 1, wherein:
preventing one or more player inputs from being interpreted by the video game application as player input that is reactive to the player interactive window comprises preventing all player inputs received at the server during the filter window from being interpreted by the video game application as player input that is reactive to the player interactive window.

10. The method of claim 1, wherein:
detecting instantiation of the player interactive window further comprises receiving a notification from the video game application that the player interactive window is being instantiated by the video game application.

11. The method of claim 1, wherein the object recognition model represents one or more characteristics indicative of a player interactive window, including at least one of: a location of the object within a certain area of the frame, a size or dimension of the object, a shape of the object, a presence of certain alphanumeric characters in the object, a color of the object, or a shading of the object.

12. A non-transitory computer-readable medium storing at least one set of executable instructions, the at least one set of executable instructions configured to manipulate at least one processor to:
execute a video game application at a server that is remotely connected to a game controller and a client device used for player interaction with the video game application; and
responsive to detecting, at the server, instantiation of a player interactive window in a video stream generated in association with the video game application, prevent one or more player inputs from the game controller that are received in a specified filter window following instantiation of the player interactive window from being interpreted by the video game application as player input that is reactive to the player interactive wherein detecting instantiation of the player interactive window includes detecting, at the server, an initial presence of an object indicating a player interactive window is present in a frame of the video stream using an object recognition module.

13. A remote gaming system comprising:
a server coupleable to a client device and to a game controller via a network, the server configured to:
execute a video game application; and
responsive to detecting instantiation of a player interactive window in a video stream generated in association with the video game application, preventing one or more player inputs from the game controller that are received in a specified filter window following instantiation of the player interactive window from being interpreted by the video game application as player input that is reactive to the player interactive window,
wherein the server is configured to detect instantiation of the player interactive window by detecting an initial presence of an object indicating a player interactive window is present in a frame of the video stream using an object recognition model.

14. The remote gaming system of claim 13, wherein the server is configured to prevent one or more player inputs from the game controller to be interpreted by the video game application as player input that is reactive to the player interactive window during a set duration of the filter window following instantiation of the player interactive window.

15. The remote gaming system of claim 14, wherein the server is further configured to:
determine a cumulative latency representative of at least one network latency in the network connecting the server, a latency at the client device, and a latency at the game controller; and
set the duration of the filter window based on the cumulative latency.

16. The remote gaming system of claim 15, wherein the server is further configured to:
determine at least one of a first network latency for transmission of data of the video stream to the client device and a second network latency for transmission of player input data from the game controller to the server; and
wherein the cumulative latency is further representative of at least one of the first network latency and the second network latency.

17. The remote gaming system of claim 16, wherein the server is further configured to:
determine a player reaction time; and
wherein the cumulative latency is further representative of the player reaction time.

18. The remote gaming system of claim 13, wherein:
the server is configured to prevent the one or more player inputs from being interpreted by the video game application as player input that is reactive to the player interactive window by at least one of:
filtering out the one or more player inputs from a player input stream provided to the video game application for a duration of the filter window;
temporarily setting the player interactive window as non-interactive in the video game application for a duration of the filter window; or
determining a subset of one or more player inputs that invoke an action with respect to the player interactive window and preventing only those player inputs of the determined subset from being interpreted by the video game application as player input that is reactive to the player interactive window; or
preventing all player inputs received at the server during the filter window from being interpreted by the video game application as player input that is reactive to the player interactive window.

19. The remote gaming system of claim 13, wherein:
the server is further configured to detect instantiation of the player interactive window by receiving notification from the video game application that the player interactive window is being instantiated by the video game application.

20. The remote gaming system of claim 13,
wherein the object recognition model represents one or more characteristics indicative of a player interactive window, including at least one of: a location of the object within a certain area of the frame, a size or dimension of the object, a shape of the object, a presence of certain alphanumeric characters in the object, a color of the object, or a shading of the object.

* * * * *